(12) United States Patent
Krishnamurthi et al.

(10) Patent No.: US 10,515,289 B2
(45) Date of Patent: Dec. 24, 2019

(54) SYSTEM AND METHOD OF GENERATING A SEMANTIC REPRESENTATION OF A TARGET IMAGE FOR AN IMAGE PROCESSING OPERATION

(71) Applicant: QUALCOMM Incorporated, San Diego, CA (US)

(72) Inventors: Govindarajan Krishnamurthi, Palo Alto, CA (US); Arun Raman, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 15/401,261

(22) Filed: Jan. 9, 2017

(65) Prior Publication Data
US 2018/0197040 A1    Jul. 12, 2018

(51) Int. Cl.
| | |
|---|---|
| G06F 16/00 | (2019.01) |
| G06K 9/46 | (2006.01) |
| G06T 11/60 | (2006.01) |
| G06K 9/62 | (2006.01) |
| G06F 3/0482 | (2013.01) |
| G06F 16/51 | (2019.01) |
| G06F 16/583 | (2019.01) |

(52) U.S. Cl.
CPC ........ *G06K 9/4671* (2013.01); *G06F 3/0482* (2013.01); *G06F 16/51* (2019.01); *G06F 16/583* (2019.01); *G06K 9/4604* (2013.01); *G06K 9/6256* (2013.01); *G06T 11/60* (2013.01); *G06T 2207/20081* (2013.01)

(58) Field of Classification Search
CPC .. G06K 9/4671; G06K 9/6256; G06K 9/4604; G06F 16/583; G06F 16/51; G06F 3/0482; G06T 11/60; G06T 2207/20081
See application file for complete search history.

(56) References Cited

U.S. PATENT DOCUMENTS

| | | |
|---|---|---|
| 8,706,740 B2 | 4/2014 | Hua et al. |
| 9,008,446 B2 | 4/2015 | Tan et al. |

(Continued)

OTHER PUBLICATIONS

Xu et al., "Image Search by Concept Map", Jul. 2010, ACM, pp. 275-282 (Year: 2010).*

(Continued)

*Primary Examiner* — Alexander Khong
(74) *Attorney, Agent, or Firm* — The Marbury Law Group

(57) ABSTRACT

Various embodiments may include a computing device analyzing an image to identify one or more elements of interest in the image, identifying concepts associated with elements of interest in the image, and identifying potential elements of interest and potential concepts that are not included in the image using other information. Various embodiments may include presenting the one or more elements of interest, the one or more potential elements of interest, and the one or more concepts, receiving a user input that selects one or more of the one or more elements of interest, the one or more potential elements of interest, and the one or more concepts identified in the identified elements of interest and concepts or any combination thereof for a target image, and generating the semantic representation of the target image based on the selected elements of interest and concepts.

24 Claims, 9 Drawing Sheets

(56) References Cited

U.S. PATENT DOCUMENTS

| | | | |
|---|---|---|---|
| 9,117,146 | B2 | 8/2015 | Li et al. |
| 9,563,646 | B1* | 2/2017 | Chan .................. G06Q 30/0224 |
| 2007/0071323 | A1 | 3/2007 | Kontsevich et al. |
| 2011/0052069 | A1* | 3/2011 | Nakabayashi ....... G11B 27/105 382/190 |
| 2011/0158558 | A1* | 6/2011 | Zhao ................... G06F 16/5838 382/305 |
| 2012/0269441 | A1* | 10/2012 | Marchesotti .......... G06T 7/0002 382/195 |
| 2015/0063725 | A1 | 3/2015 | Tai |
| 2015/0154232 | A1* | 6/2015 | Ovsjanikov ........... G06F 16/583 707/780 |
| 2017/0206416 | A1* | 7/2017 | Chen .................. G06K 9/00671 |
| 2017/0262479 | A1* | 9/2017 | Chester ................. G06F 16/583 |
| 2017/0309004 | A1* | 10/2017 | Zepeda Salvatierra ...................... G06K 9/4676 |
| 2018/0121768 | A1* | 5/2018 | Lin .......................... G06K 9/66 |
| 2018/0276244 | A1* | 9/2018 | Popescu ................ G06F 16/583 |
| 2019/0050648 | A1* | 2/2019 | Stojanovic ......... G06K 9/00791 |

OTHER PUBLICATIONS

International Search Report and Written Opinion—PCT/US2017/062494—ISA/EPO—dated Feb. 23, 2018.
Liu Y., et al., "A Survey of Content-based Image Retrieval With High-Level Semantics", Pattern Recognition, Elsevier, GB, vol. 40, No. 1, Oct. 29, 2006, pp. 262-282, XP005837170, ISSN: 0031-3203, DOI: 10.1016/J.PATCOG.2006.04.045.

* cited by examiner

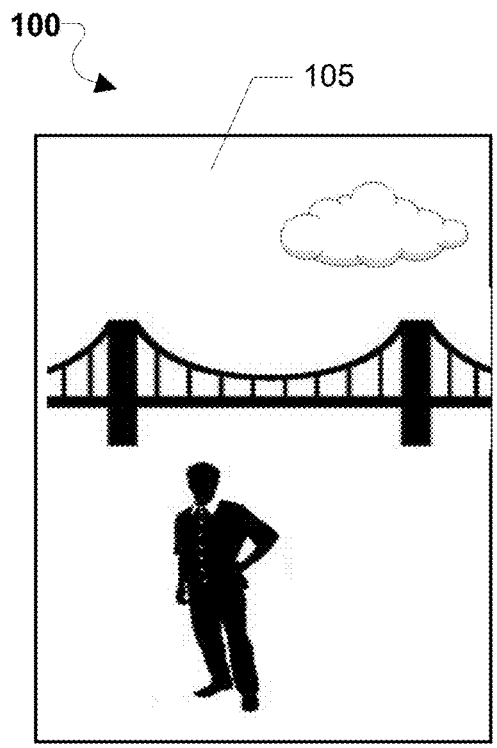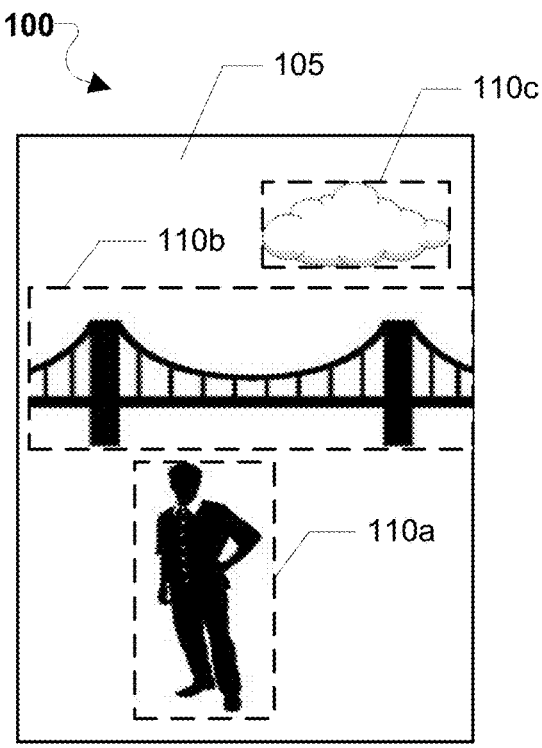
FIG. 1A
FIG. 1B
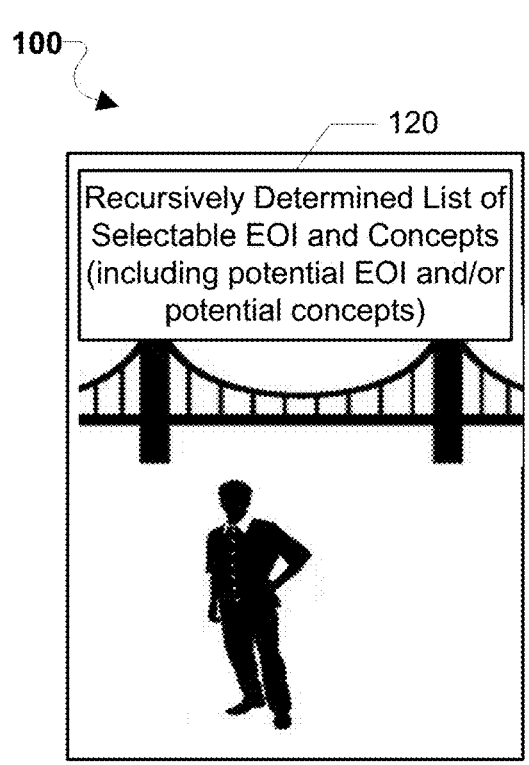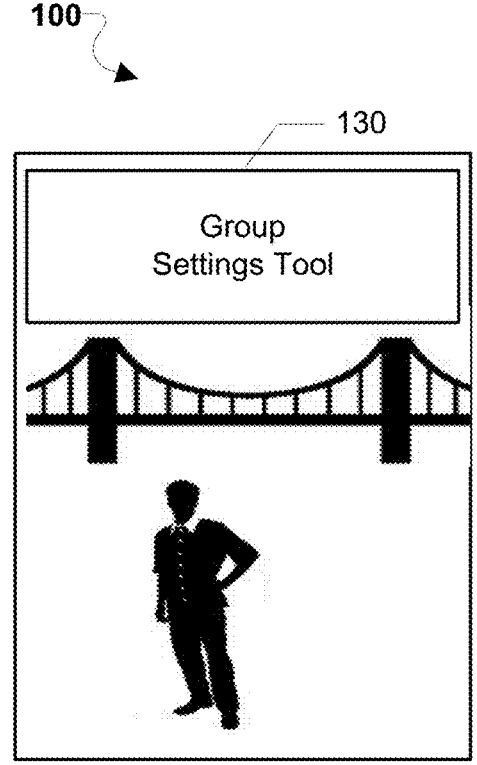
FIG. 1C
FIG. 1D

SYSTEM AND METHOD OF GENERATING A SEMANTIC REPRESENTATION OF A TARGET IMAGE FOR AN IMAGE PROCESSING OPERATION

BACKGROUND

Existing search engines can provide mechanisms for performing an image search. In an image search, the user typically submits an image query that includes an image file (or a link to the image file) to the image search engine. The image search engine analyzes the content of the image, searches for other images that are similar to the image content, and presents the results to the user. However, most image search engines do not provide a mechanism through which a user can define a complex semantic representation of a target image to search.

SUMMARY

Various embodiments include methods and computing devices implementing the methods of generating a semantic representation of an image for an image processing operation. Various embodiments may include analyzing an image to identify one or more elements of interest in the image, identifying one or more concepts associated with the one or more elements of interest in the image, and identifying one or more potential elements of interest that are not included in the image using other information, in which the one or more potential elements of interest describe one or more instances of the one or more concepts. Various embodiments further may include presenting the one or more elements of interest, the one or more potential elements of interest, and the one or more concepts, receiving a user input that selects one or more of the one or more elements of interest, the one or more potential elements of interest, and the one or more concepts identified in the identified elements of interest and concepts or any combination thereof for a target image, and generating the semantic representation of the target image based on the selected elements of interest and concepts.

Some embodiments may further include identifying one or more potential concepts that describe the one or more potential elements of interest not included in the image, and identifying one or more other potential elements of interest that are not included in the image, in which the one or more other potential elements of interest describe one or more instances of the one or more potential concepts. Such embodiments may further include continuing to recursively identify other potential concepts, other potential elements of interest, or any combination thereof until a maximum recursion depth is reached.

Some embodiments may further include performing the image processing operation based on the generated semantic representation of the target image, in which the image processing operation may include an image search operation, an image editing operation, and an image mining operation, or any combination thereof.

Some embodiments may further include receiving a user input that includes one or more grouping parameters, in which the one or more grouping parameters define one or more groups of the selected elements of interest and concepts for the target image, in which generating the semantic representation of the target image based on the selected elements of interest and concepts may include generating the semantic representation of the target image based on the selected elements of interest and concepts and the user input.

Some embodiments may further include receiving a user input that includes one or more spatial parameters for the target image, in which the one or more spatial parameters define one or more spatial relationships amongst the selected elements of interest and concepts for the target image, and generating the semantic representation of the target image based on the selected elements of interest and concepts and the user input.

Some embodiments may further include receiving a user input that includes one or more temporal parameters for the target image, in which the one or more temporal parameters define a specific time or time period for the target image. In such embodiments, generating the semantic representation of the target image based on the selected elements of interest and concepts may include generating the semantic representation of the target image based on the selected elements of interest and concepts and the user input.

Some embodiments may further include receiving a user input of a first semantic representation of the target image, querying a database using the first semantic representation of the target image, retrieving a plurality of images and associated metadata from the database in response to querying the database with the first semantic representation, and sorting the plurality of images and associated metadata based on a ranking. In such embodiments, analyzing the image to identify one or more elements of interest in the image may include analyzing one or more top ranked images and associated metadata amongst the plurality of images and associated metadata to identify one or more elements of interest in the one or more top ranked images, identifying the one or more concepts associated with the one or more elements of interest in the image comprising identifying one or more concepts associated with the one or more elements of interest identified in one or more top ranked images, and identifying the one or more potential elements of interest that are not included in the image using the other information may include identifying one or more potential elements of interest that are not included in the one or more top ranked images using the associated metadata of the one or more top ranked images.

Further embodiments include a computing device having a memory and a processor that is coupled to the memory and configured with processor-executable instructions to perform operations of the methods summarized above. Further embodiments may include a computing device that includes means for performing functions of the methods summarized above. Further embodiments may include a non-transitory processor-readable storage medium having stored thereon processor executable instructions configured to cause a processor of a computing device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIGS. 1A, 1B, 1C, 1D, 1E and 1F are schematic diagrams illustrating example user interfaces for generating a semantic representation of a target image according to some embodiments.

DETAILED DESCRIPTION

Figure 1E:
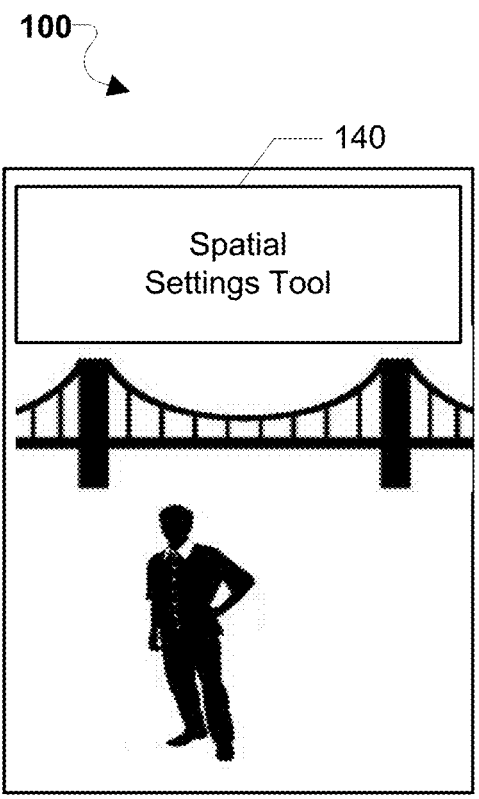

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" is used herein to refer to an electronic device equipped with at least a processor. Examples of computing devices may include, but not limited to, mobile communication devices (e.g., cellular telephones, wearable devices, smart-phones, web-pads, tablet computers, Internet enabled cellular telephones, Wi-Fi® enabled electronic devices, personal data assistants (PDA's), etc.), personal computers (e.g., laptop computers, etc.), and servers.

Various embodiments provide methods implemented in computing devices for generating a semantic representation of a target image by recursively analyzing the image in combination with other data available to the computing device or provided by a user to identify elements of interest ("EOI" in the figures) and concepts in an input image as well as potential elements of interest (potential "EOI" in the figures) and/or potential concepts not included in the image. Recursively analyzing the target image and other information available to the computing device enables elements of interest and concepts identified in a previous analysis to be leveraged in a subsequent analysis in order to identify further layers of concepts and more specific elements of interest within or related to the target image that may be useful in categorizing, characterizing, relating, processing, and searching the target image. Information obtained from user databases (e.g., calendar records, contact lists, etc.) may be used in recursive analyses to identify activities, locations, individuals, etc. within the target image. Metadata (e.g., date, time, location, etc.) within or associated with the target image may be used to identify information that can be related to other information, such as dates and locations within a user's calendar database. User inputs may be used in recursive analyses to identify elements of interests or particular concepts within the target image, or inferred from the target image, that are of particular interest to the user. The results of a number of iterative analyses of a target image in combination with user databases, image metadata and user inputs may be a more robust analysis and/or semantic characterization of the target image that may be useful for purposes of categorizing, relating, processing or searching images. Various embodiments may be particularly suitable for use in enhancing image searches or other image analysis operations.

Some embodiments may include analyzing the image to identify elements of interest and concepts associated with the elements of interest in an input image. Identified elements of interest and concepts may then be used to identify further potential elements of interest that are not included within the image but are related to concepts associated with the elements of interest that are within the image. In some embodiments, potential concepts associated with identified potential elements of interest may also be determined, and identified potential concepts may be used for recursively determining other potential elements of interest. Such potential elements of interest and potential concepts may be determined by combining other sources of information within a computing device, such as the user's calendar database, user's contact database, etc. Thus, the various embodiments provide a recursive analysis of images that enable a computing device to infer deeper meaning to the user of a target image in the form of elements of interest and concepts that may extend beyond what appears in the image.

Elements of interest and concepts determined from analyzing the target image, user databases, image metadata and user inputs through one or more recursive analysis routines may be presented to a user on a display (which may include a user interface generated on the computing device or by a remote server, such as in the "cloud") to enable the user to select elements of interest and/or concepts (including potential elements of interest and/or concepts) for generating a semantic representation of the target image. User selections of elements of interest and/or concepts displayed or highlighted may then be used in subsequent iterations of image and other data analysis to identify further elements of interest or concepts that may be relevant to the user. Thus, by enabling user selection of elements of interest, potential elements of interest, concepts and/or potential concepts through a user interface, a richer, more detailed semantic representation of the target image may be obtained for use in image searches or other image analysis operations. By presenting elements of interest and/or concepts (including potential elements of interest and/or concepts) on a user interface (e.g., a touchscreen display), a more interactive image analysis and search tool may be presented to users. Such a user interface may be generated with the computing device processor, or may be generated by another computing device, such as in the "cloud." In some embodiments, the user interface may also enable a user to define various group, temporal, and spatial relationships amongst the elements of interest, potential elements of interest, concepts and/or potential concepts identified in the selected elements of interest and concepts for the target image.

The term "element of interest" is used herein to refer to a person, place, or a tangible object that may be identified, selected, and/or detected in an image. Elements of interest may be recognized objects or persons appearing in the foreground of an image; however, elements of interest may also be objects or scenery appearing in the background of the image. After a number of iterations of image analysis, which may include user inputs selecting particular elements of interest for analysis, elements of interest may become smaller, less significant, or more specific articles or objects within the image.

The term "concept" is used herein to refer to an attribute, category, type, quality, characteristic, trait, feature, classification, or an event that may be associated with, derived from, or determined based on one or more elements of interest (EOI). Concepts may overlap with elements of interest. For example, image analysis that recognizes a person in an image as John Smith may be associated with the concepts "man," "friend" and/or "family."

Elements of interest and concepts may be described as identified and labeled using language labels (e.g., "person," "Mary," "friend," "vacation," etc., these examples are for ease of description). However, elements of interest and concepts may be tracked, stored and manipulated by a computing device using any symbolic labels automatically generated and/or stored and usable by a processor. For example, elements of interest and concepts may be assigned binary codes, and may be stored as metadata with an analyzed image or in a separate data structure or database linked to the analyzed image.

FIGS. 1A, 1B, 1C, 1D, 1E and 1F are schematic diagrams illustrating a user interface 100 for displaying elements of interest and concepts identified through machine analysis of a target image, for receiving user inputs for use in conducting further iterations of image analysis and generating a semantic representation of a target image according to some embodiments. In some embodiments, the user interface 100 may be a graphical user interface that is executed by a processor of a computing device. In some embodiments, the user interface 100 may be generated by an application user interface (UI) process executing on the processor of the computing device. In some embodiments, the application UI process may be configured to communicate with a remote server over a network or locally to a service executing on the computing device to perform an image analysis and/or search operation, an image mining operation, an image edit operation, or other type of image processing operation. In some embodiments, the user interface 100 may be generated by remote server and transmitted to the computing device for display (e.g., an interactive webpage). In some embodiments, the remote server may be in the "cloud."

As shown in FIG. 1A, the user interface 100 may display an input image 105. In some embodiments, the displayed input image 105 may be loaded from an image file that is specified via user inputs through the user interface 100, such as an "open file" or "download file" dialog box (not shown). In some embodiments, the image file may be specified at a location in memory of the computing device or using a network link or address (e.g. universal resource locator or "URL").

As shown in FIG. 1B, the user interface 100 may be configured to highlight or otherwise identify potential elements of interested based upon a first iteration of image analysis, such as highlighting or identifying foreground objects that are recognized (e.g., faces). In the example illustrated in FIG. 1B, the elements of interest in the image 105 may include "John Smith" 110a (e.g., determined through facial recognition), "Golden Gate Bridge" 110b (e.g., determined by matching the background object to known objects categorized in an image database), and a "cloud" 110c (e.g., determined via analysis heuristics based on color, shape, position in the image, etc.).

The user interface 100 may be configured to receive a user input that selects or identifies one or more elements of interest in the image (e.g., 110a, 110b, 110c). In some embodiments, the user may use a pointing device to identify one or more elements of interest in the image 105 by selecting one or more automatically generated graphical indications (e.g., labels, bounding boxes, or other overlay graphics, etc.) of various elements detected within the image 105. In some embodiments, a user may interact with the user interface 100 to identify an element of interest (EOI) in an input image 105 by using a pointing device (e.g., mouse, stylus, finger, etc.) to encircle or otherwise specify a bounding region that contains the element of interest in the image. For example, such user inputs may be in the form of a mouse click on a highlighted object identified in a first analysis iteration, a mouse click on an object not recognized in the first analysis iteration (i.e., an object that is not highlighted), a user-input line or loop encompassing a part of the image, etc. In some embodiments, the user interface 100 may be configured with a speech recognition capability so that the user may input voice commands to identify one or more elements of interest in the image 105.

In some embodiments, the user interface 100 may be configured to communicate the input image 105 and the user-identified elements of interest from the input image (e.g., 110a, 110b, 110c) over a network to a remote server or locally to a service executing on the computing device. In some embodiments, the user interface 100 may communicate supplemental information associated with the input image 105 in addition to the input image 105 and/or the user-identified elements of interest, such as date-time stamp, geographic location and/or other image metadata for example.

In response, the remote server or local service may be configured to identify elements of interest and concepts in the image as well as potential elements of interest and optionally potential concepts not included in the image. For example, in response to determining the concept of "vacation" from the elements of interest 110a, 110b, and 110c identified in the image 105, the remote server or local service may identify one or more potential elements of interest that describe a specific instance of the "vacation" concept (e.g., "California 2016"). Examples of embodiments for recursively identifying elements of interest and concepts are described and illustrated in more detail with reference to FIGS. 3 and 4.

Upon return of the recursively identified elements of interest and concepts from the remote server or local service, the user interface 100 may be configured to display the recursively identified elements of interest and concepts as shown in FIG. 1C. In some embodiments, the user interface 100 may display the identified elements of interest and concepts as a list of selectable elements of interest and concepts, including potential elements of interest and optionally potential concepts, through a graphical window (e.g., a pop-up window, a frame or an overlay) 120. For example, the graphical window 120 may display "John Smith," "Golden Gate Bridge" "clouds" as elements of interest identified in the image, "man," "bridge,", "cloudy," and "vacation" as concepts associated with the elements of interest in the image, and "California 2016" as a specific instance of the "vacation" concept. In another embodiment, the recursively identified elements of interest and concepts may be associated with example images containing those elements of interest and concepts drawn from a database of images, thereby allowing the user to interactively select a subset of images (and therefore the elements of interest and concepts exemplified by those images) to operate on further.

In some embodiments, the graphical window 120 may also display interactive selection elements for selecting amongst the displayed elements of interest and concepts of the selectable elements of interest (EOI) and concepts for inclusion in the semantic representation of the target image. For example, the interactive selection elements (e.g., check boxes, radio buttons, selectable menu items, etc.) may be used to select any combination of the displayed elements of interest and concepts (e.g. "John Smith," "Golden Gate Bridge" "clouds," "man," "bridge,", "cloudy," "vacation" and "California 2016").

In some embodiments, the user interface 105 may also enable a user to define various group, spatial and temporal relationships amongst the elements of interest and/or concepts identified in the selected elements of interest and concepts for the target image. For example, as shown in FIG. 1D, the user interface 100 may be configured to display a group settings tool 130 for defining one or more group relationships amongst the selected elements of interest and concepts for the target image. In some embodiments, a group may be defined using one or more grouping parameters. In some embodiments, the one or more grouping parameters may include, but are not limited to Boolean operators (e.g., AND, OR, NOT). In some embodiments, the group settings tool 130 may display an automatically generated list of selectable groups of elements of interest and/or concepts identified in the selected elements of interest and concepts using one or more grouping parameters. In some embodiments, the group settings tool 130 may enable a user to define a group by specifying one or more grouping parameters for including or excluding one or more elements of interest or concepts with respect to the defined group.

As shown in FIG. 1E, the user interface 100 may be configured to display a spatial settings tool 140 for defining one or more spatial parameters corresponding to one or more of the selected elements of interest within or related to the target image. In some embodiments, the spatial settings tool 140 may be configured to enable a user to define a spatial relationship between two or more selected elements of interest or concepts identified within or related to the target image (e.g., "man" IN FRONT OF "bridge"). Examples of other spatial relationships may include, without limitation, "in back of," "above," "below," "overlaying," "to the left of," "to the right of," etc. In some embodiments, the spatial settings tool 140 may be configured to enable a user to define a viewpoint of a selected elements of interest for the target image. For example, the spatial settings tool 140 may enable a user to specify a viewpoint of the selected elements of interest at a desired angular perspective (e.g., 360-degree camera-like interface).

Figure 1F:
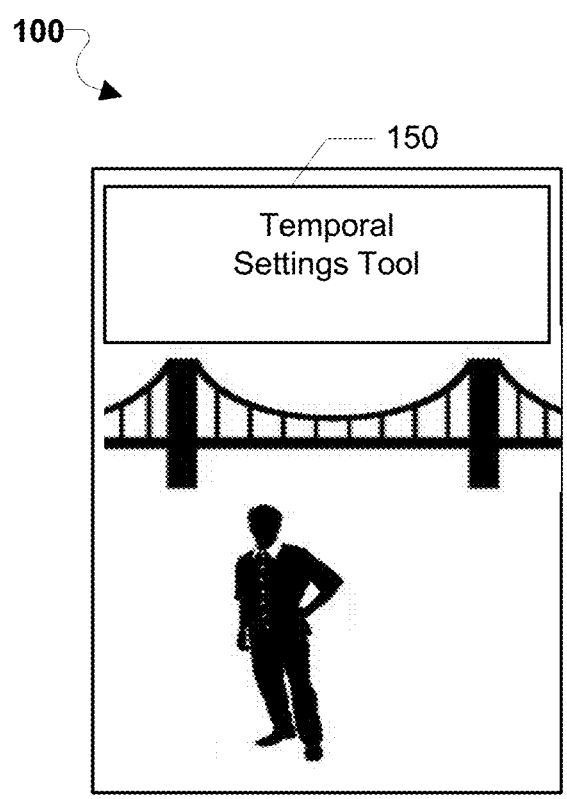

As shown in FIG. 1F, the user interface 100 may be configured to display a temporal settings tool 150 for defining one or more temporal parameters for the semantic representation of target image. For example, in some embodiments, the temporal settings tool 150 may be a graphical slider bar that specifies a timeline covering a period of years. In some embodiments, the specified timeline may cover longer or shorter time spans. By dragging a slider element of the graphical slider bar forward or backward, a user may set a specific time or time period for the target image (e.g., "1980"). In some embodiments, the set time or time period may correspond to when the target image was created or when the image was uploaded or stored in a database.

In response to receiving the user input selecting from amongst the identified elements of interest and concepts and defining the group, spatial and temporal relationships, the remote server or service executing on the computing device may generate a semantic representation of the target image based on such information.

Figure 2A:
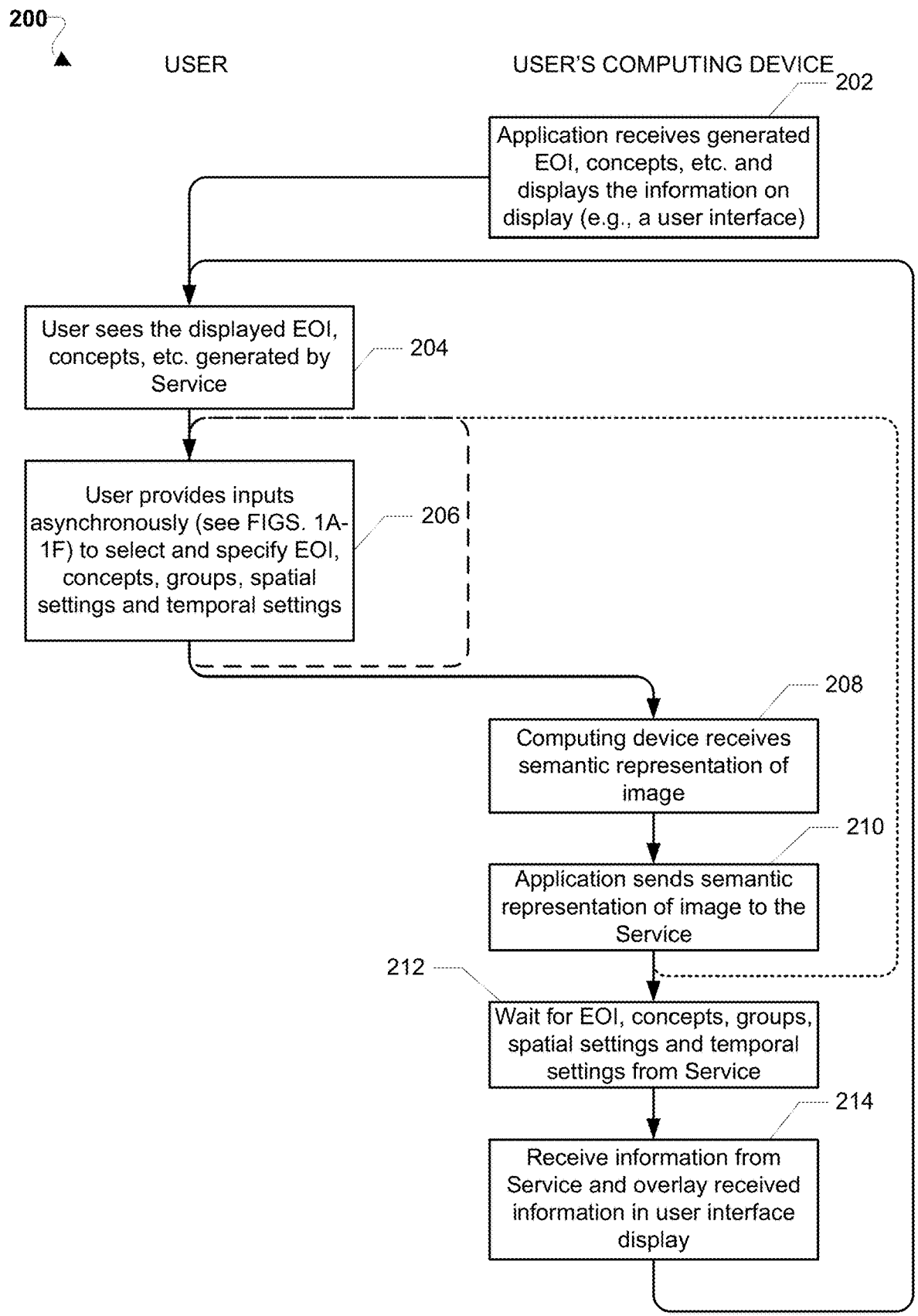
FIG. 2A is a process flow diagram illustrating interactions between a user and a user's computing device implementing various embodiments.
Figure 2B:
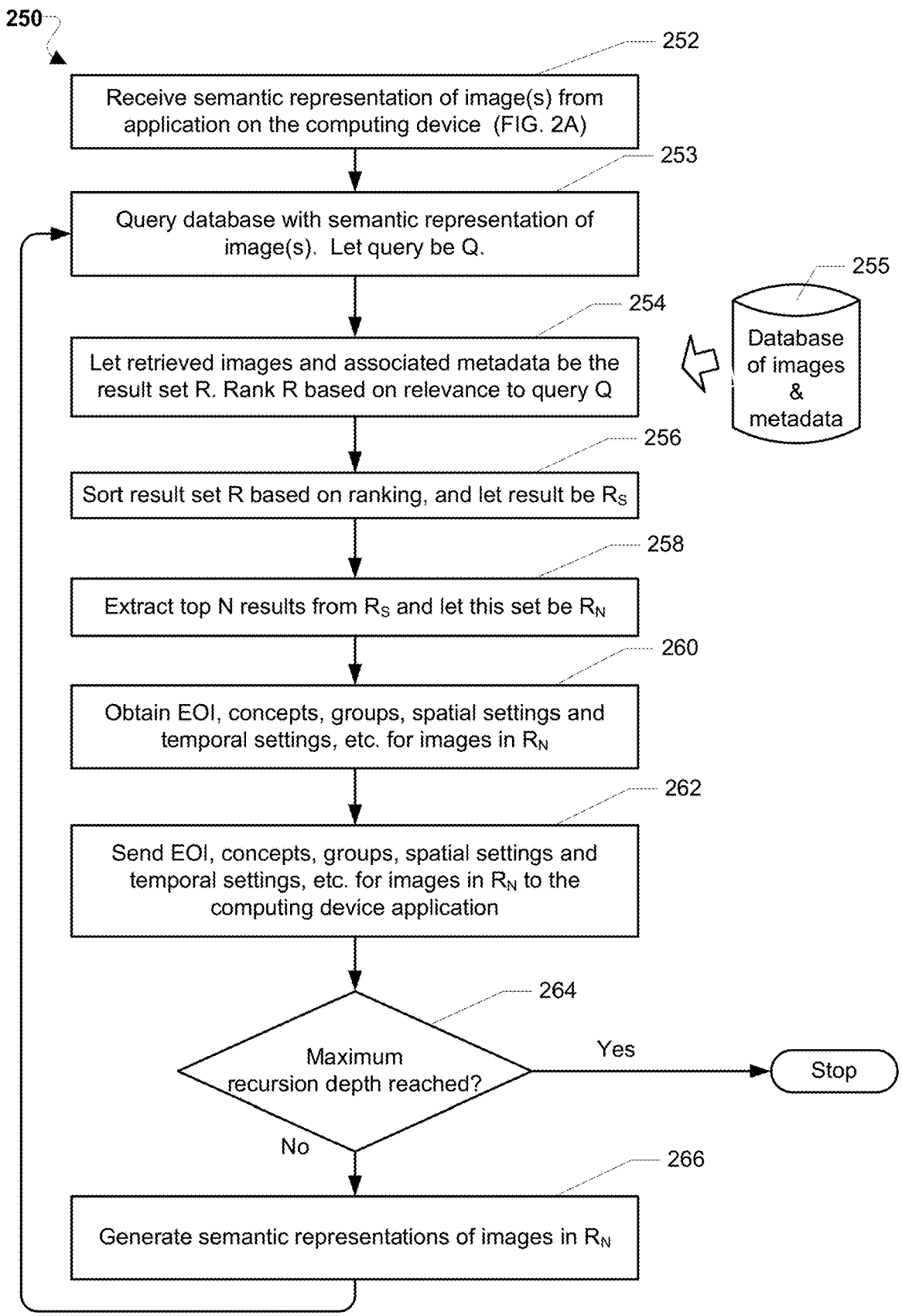
FIG. 2B is a process flow diagram illustrating operations of a service provided by a server (or other computing device) to the user's computing device according to various embodiments.

Interactions of users with their computing devices and computing devices with a service provided by a remote computer, such as a server, are illustrated in FIGS. 2A and 2B. Interactions between a user and the user's computing device are illustrated in FIG. 2A. The user's computing device interacts with a service provided by remote computing device, such as a server, which performs operations illustrated in FIG. 2B.

Referring to FIG. 2A, an application executing on the user's computing device may receive from the service generated elements of interest, concepts, groups, spatial settings, and temporal settings, and display such information on a display of the computing device (e.g., within a user interface image presented on the display) in block 202. In some embodiments, the computing device may generate a user interface presented on the display that includes service generated elements of interest, concepts, groups, spatial settings, and temporal settings. In some embodiments, the computing device may receive a user interface (e.g., an interactive webpage) from a remote server of the "cloud" and present the received user interface on the display that includes service generated elements of interest, concepts, groups, spatial settings, and temporal settings.

A user sees this displayed information displayed in block 204, and may provide user inputs (e.g., by interacting with user interface elements) to select and/or specify elements of interest, concepts, groups, spatial settings and temporal settings in block 206. The user inputs (e.g., interactions with user interface elements) may occur at any time (i.e., asynchronously) after display. Further, the user inputs (e.g., interactions with the user interface displaying the image) may continue to be received over time, including after user inputs are being processed by the user's computing device, as illustrated by dashed line. Examples of such user interactions are illustrated and described above with reference to FIGS. 1A-1F.

In block 208, the computing device receives the user inputs that provide the application executing on the user's computing device with a semantic representation of the image as viewed by the user. In block 210, the application sends the semantic representation of the image to the service, such as a remote server.

Because user inputs (e.g., interactions with the user interface displaying the image) may continue for a while, the user's computing device may continue to receive user inputs providing additional semantic representations of the image in block 208 and send the additional semantic representations of the image to the service as they are received, as indicated by the dotted line. In block 212, the application may wait for the service to send back elements of interest, concepts, groups, spatial settings and temporal settings, which may include sending additional semantic representations of the image to the service while waiting.

When the service returns the elements of interest, concepts, groups, spatial settings and temporal settings information, the application overlays the received information in the display in block 214. In some embodiments, the received information may be overlaid in a user interface display in block 214. In some embodiments, a remote server (e.g., in the "cloud") may send the computing device an updated user interface including the received information for display in block 214. The user may see the adjusted information in block 204 and provide further inputs (e.g., interactions with the user interface elements) in block 206 as described.

Referring to FIG. 2B, the service, which may be executing on a remote server, receives the semantic representation of images from the application in block 252.

In block 253, the service may query an image and metadata information database 255 for relevant images using the received semantic representation of the images from block 252. In this operation, the query using the semantic representation may be referred to as query Q.

In block 254, the service may retrieve images and associated metadata from the image and metadata information database 255 determined in response to the query Q. In this operation, the received images and associated metadata may be referred to as the result set R. The service may rank the set R based on its relevance to the query Q of the database 255.

In block 256, the service may sort the result set R of retrieved images and metadata based on a ranking. This sorted result set may be referred to as $R_S$.

In block 258, the service may extract the top N results from the sorted result set $R_S$ resulting in a set $R_N$.

In block 260, the service may obtain elements of interest, concepts, groups, spatial settings and temporal settings, as well as other information, for images within the top results set $R_N$.

In block 262, the service may send the obtained elements of interest, concepts, groups, spatial settings and temporal settings, as well as other information, for images in the top results set $R_N$ to the application on the user's computing device where it is received in block 214 of the method 200 as described.

In determination block 264, the service may determine whether the maximum recursive depth has been reached in the interactions with the user's computing device. In various embodiments, the recursive depth may be anywhere between 1 and N recursions. In some embodiments, the service may determine that the maximum recursive depth is reached in response to determining that all images in the database and associated metadata have become a part of the result set R. In some embodiments, the service may determine that the maximum recursive depth is reached in response to determining that the processing time has reached a pre-defined threshold.

In response to determining that the maximum recursive depth is not been reached (i.e., determination block 264="No"), the service may generate semantic representations of the images within the top rank set $R_N$ in block 266, and then query the image and metadata information database 255 again in block 253 for relevant images using the semantic representations of images in the top rank set $R_N$ generated in block 266.

In response to determining that the maximum recursive data has been reached (i.e., determination block 264="Yes"), the service may stop interacting with the application executing on the user's computing device as a max level of analysis of the image has been provided.

Figure 3:
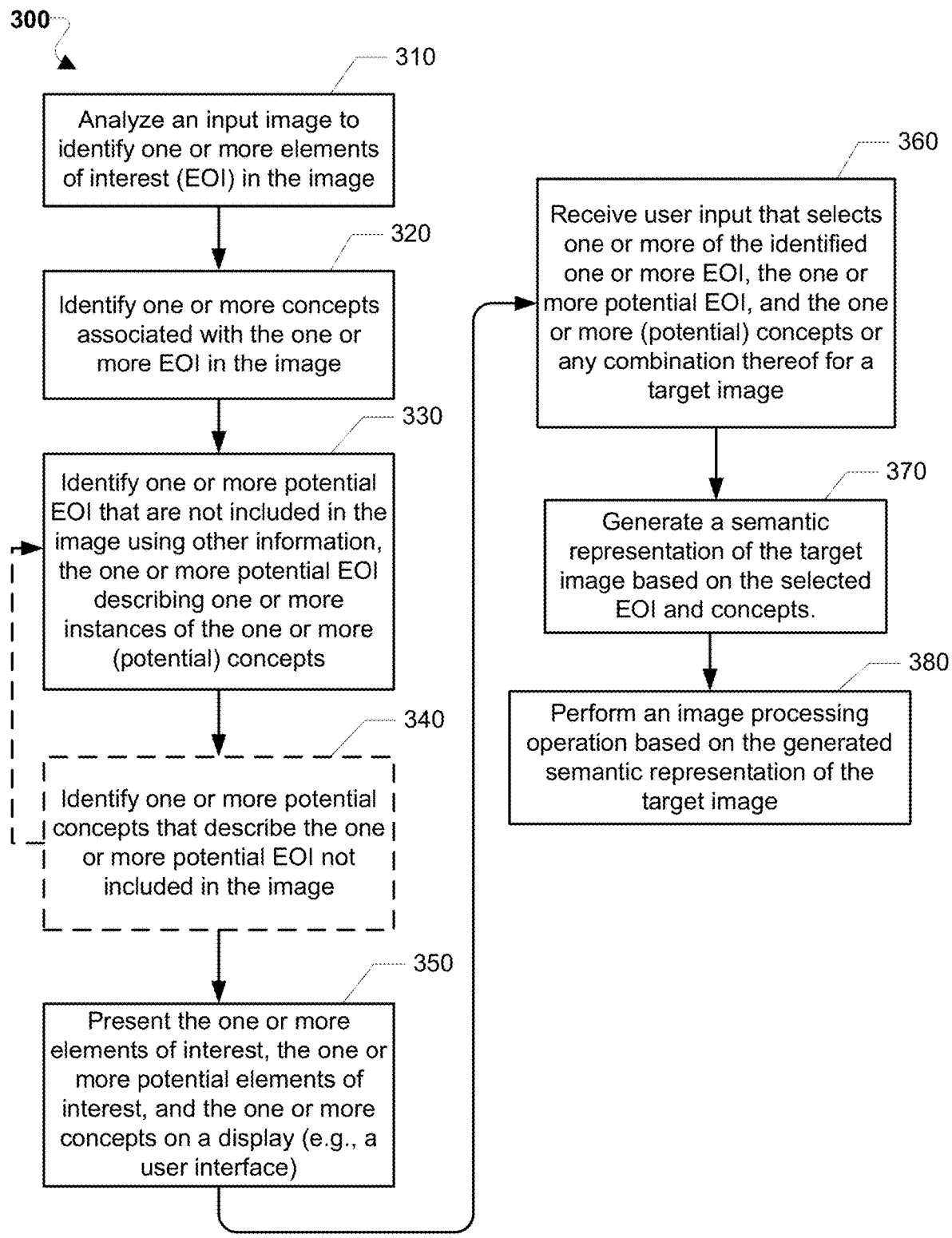
FIG. 3 is a process flow diagram illustrating a method for generating a semantic representation of a target image according to some embodiments.

FIG. 3 is a process flow diagram illustrating a method 300 for generating a semantic representation of a target image according to some embodiments. With reference to FIGS. 1A-2, operations of the method 300 may be performed by one or more processors of a remote server, one or more processors of a computing device executing a local service, or any combination thereof. In some embodiments, the remote server, the local service, or any combination thereof may also perform an image search operation, an image mining operation, an image edit operation or other type of image processing operation based on the generated semantic representation of the target image.

In block 310, the processor may analyze an input image (e.g., 105 of FIG. 1B) to identify one or more elements of interest (e.g., 110a, 110b, 110c of FIG. 1B) in the image. For example, in some embodiments, the processor may be configured with an image processing algorithm that is capable of determining elements of interest by analyzing image content within one or more user-selected bounded regions of the input image (e.g., 105) that contain one or more elements of interest (e.g., 110a, 110b, 110c). For example, the elements of interest in the image 105 may include "John Smith," "Golden Gate Bridge," and "cloud."

In some embodiments, the input image (e.g., 105) may be loaded from an image file that is specified via user inputs (e.g., through a user interface 100), such as an "open file" or "download file" dialog box (not shown). In some embodiments, the image file may be specified at a location in memory of the computing device or using a network link or address (e.g. universal resource locator or "URL").

In some embodiments, the input image (e.g., 105) may include one or more input images obtained from a query of an image database using an initial semantic representation for the target image. For example, the initial semantic representation may be a query string include a list of one or more key words. In some embodiments, the set of one or more input images may be determined by retrieving images that satisfy the query, ranking the retrieved images based on the relevance to the query, sorting the ranked set of retrieved images and using one or more of the top ranked images as an input image for analysis in generating a more complex representation of the target image.

In block 320, the processor may identify one or more concepts associated with the one or more elements of interest in the image determined in block 310. For example, the concepts of "man," "bridge," "cloudy," and "vacation" may be determined from the elements of interest 110a, 110b, 110c in the image 105 (i.e., "John Smith," "Golden Gate Bridge," and "cloud").

In some embodiments, the processor may be configured to identify one or more concepts associated with an element of interest in the image using a concept learning technique. Concept learning is a type of machine learning or artificial learning in which a processor may be trained on example images of objects (e.g., people, places or things) to "learn" associated concepts. After such training, the processor may be configured to assign one or more concepts to an element of interest that is similar to training images. Concept learning may be broadly classified to include supervised learning and unsupervised learning.

In supervised learning, the processor may be trained on examples of images that both illustrate the concept and negate the concept. For example, the processor may be trained on images of cats and dogs with the former labeled as examples of the concept "cat" and the latter labeled as examples of the concept "not cat". By extracting salient features via image processing techniques (e.g., eyes, nose shapes, face shapes, whisker lengths, furriness, size, etc.), the processor may construct a mathematical model in the "feature space" and determine a mathematical object known as a "hyperplane" to separate cats from non-cats, thus effectively learning the concept of a "cat." Using the learned hyperplane in the feature space, the processor may accurately detect instances of the learned concept and assign one or more concepts to an instance detected as an element of interest in the image.

In unsupervised learning, the processor may be trained on examples of images without any manually supplied labels. For example, the processor may be trained on a large image database of objects (e.g., people, places or things). The processor extracts salient features via image processing techniques that are then combined with techniques such as k-nearest neighbors or neural networks that may enable the processor to form clusters in the feature space, where each cluster represents a different concept. If these learned concepts are similar to concepts previously learned by the processor, the processor may assign similar labels to the newly learned concepts. In some embodiments, such labels may be human language labels or symbolic labels automatically generated and used by the processor. Further, the processor may discover hierarchies of clusters, thereby learning even more abstract concepts, such as "living things" as opposed to "inanimate objects".

In block 330, the processor may identify one or more potential elements of interest that are not included in the image (e.g., 105) using other information. The one or more potential elements of interest may describe one or more instances of the one or more concepts determined in block 320 that are associated with the one or more elements of interest in the image (e.g., 105). For example, a potential element of interest of "California 2016" may be determined as a specific instance of the concept of "vacation."

In some embodiments, for example, the processor may identify one or more potential elements of interest that are not included in the image by accessing a database of images and associated metadata using as search keys the one or more concepts determined in block 320. The metadata associated with each image in the database may include, but is not limited to, information such as elements of interest (EOI) in the image and concepts in the image (e.g., previously determined according to various embodiments and stored in metadata with the image), date/time of the image, location of the image, names of albums in which the image is present (e.g. "California 2016"), and tags (e.g., "fun times", "family", and "love". In some embodiments, the metadata associated with each image may be supplied by the user or automatically generated for each image. In some embodiments, the metadata may be pre-computed or computed on demand in response to a request by a processor to compute the metadata.

In some embodiments, the image database may be searched using a key-value dictionary data structure included in the database or constructed from the information stored in the database. The key-value dictionary data structure may include a number of key-value pairs, such that each key identifies a concept having one or more values that reference one or more stored images and associated metadata that are related to that concept. Using the one or more concepts identified in block 320 as search keys, the processor may search the key-value dictionary data structure to identify potential elements of interest from the images and associated metadata stored in the database (e.g., California 2016") as specific instances of the concept(s) being searched (e.g., "vacation").

In optional block 340, the processor may identify one or more potential concepts that describe the one or more potential elements of interest not included in the image (e.g., 105). In some embodiments, the processor may identify one or more potential concepts in a manner similar to that disclosed in block 330, except that the one or more potential elements of interest determined in block 330 are used as keys to search the database for those potential concepts.

In some embodiments, the processor may repeat the operations in block 330 to identify one or more potential elements of interest relevant to the one or more potential concepts identified in optional block 340. In some embodiments, the processor may repeat optional block 340 and block 330 one or more times to recursively identify other potential elements of interest and potential concepts. In some embodiments, the processor may continue to repeat the operations in blocks 330 and 340 until a maximum recursion depth is reached (e.g., the processor completes a predetermined number of iterations of block 330 and 340).

In block 350, the processor may present the elements of interest and concepts determined in blocks 310, 320, 330 and optionally 340 on a display of the computing device, such as through a user interface. In some embodiments, the processor may communicate commands or other instructions to a user interface (e.g., 100) executing on a computing device to display the identified elements of interest and concepts (including potential elements of interest and concepts) in a graphical window (e.g., 120 of FIG. 1C). In some embodiments, a remote server (e.g., in the "cloud") may send to the computing device a user interface for display (e.g., an interactive webpage) that includes identified elements of interest and concepts (including potential elements of interest and concepts) in a graphical window (e.g., 120 of FIG. 1C). For example, the graphical window 120 may display "John Smith," "Golden Gate Bridge" "clouds" as elements of interest identified in the image, "man," "bridge,", "cloudy," and "vacation" as concepts associated with the elements of interest in the image, and "California 2016" as potential elements of interest as a specific instance of the "vacation" concept.

In block 360, the processor may receive user inputs (e.g., through a user interface (e.g., 100)) that selects one or more of the elements of interest, concepts, potential elements of interest, and potential concepts identified in or related to the target image. For example, the processor may receive user inputs through various interactive selection elements of the user interface (e.g., check boxes, radio buttons, selectable menu items, for example) to input a selected combination of the displayed elements of interest and concepts to the processor (e.g. "John Smith," "Golden Gate Bridge" "clouds," "man," "bridge," "cloudy," "vacation," and "California 2016").

In block 370, the processor may generate a semantic representation of the target image, which may be based on the selected elements of interest and concepts determined in block 360. For example, in some embodiments, the semantic representation of the target image may be implemented a text string, array, linked list, or other data structure that includes a list of the selected elements of interest and concepts. In some embodiments, the semantic representation of the target image may also include one or more additional parameters for defining group, spatial, and/or temporal relationships amongst the selected elements of interest and concepts. Examples of embodiments for defining such group, spatial and temporal relationship are described and illustrated in more detail with reference to FIG. 4.

In block 380, the processor may perform an image processing operation based on the generated semantic representation of the target image. In some embodiments, the processor may use the generated semantic representation of the target image to perform an image search operation in an image database. For example, the semantic representation generated for the target image may be used to convey additional information for the image search operation that may not be readily conveyed from the input image alone. For example, the semantic representation of the target image may specify additional elements of interest or concepts to search that are not included in the image (e.g., potential elements of interest). The semantic representation of the target image may specify elements of interest or concepts that should be excluded from the search results. The semantic representation of the target image may also specify desired group, spatial and/or temporal relationships amongst elements of interest or concepts selected for the search.

In some embodiments, the processor may use the generated semantic representation of the target image to perform an image editing operation on an input image. In some embodiments, the image editing operation may include substituting a selected element of interest with a semantic representation of the target element of interest. For example, a user may select an identified bridge in the background of an input image (e.g. "Golden Gate Bridge") as a first element of interest, and may combine the first element of interest with a concept such as "cloudy" to construct a grouping such as "Golden Gate Bridge NOT cloudy." This semantic representation of the target element of interest may then be used to query a database of images to obtain the best picture of the Golden Gate Bridge when it is not cloudy. This picture may then be substituted into the background of the original image, thereby rendering a superior image to the original. Some image manipulation of the obtained best picture may be performed to match the size and perspective of the object in the original image.

Figure 4:
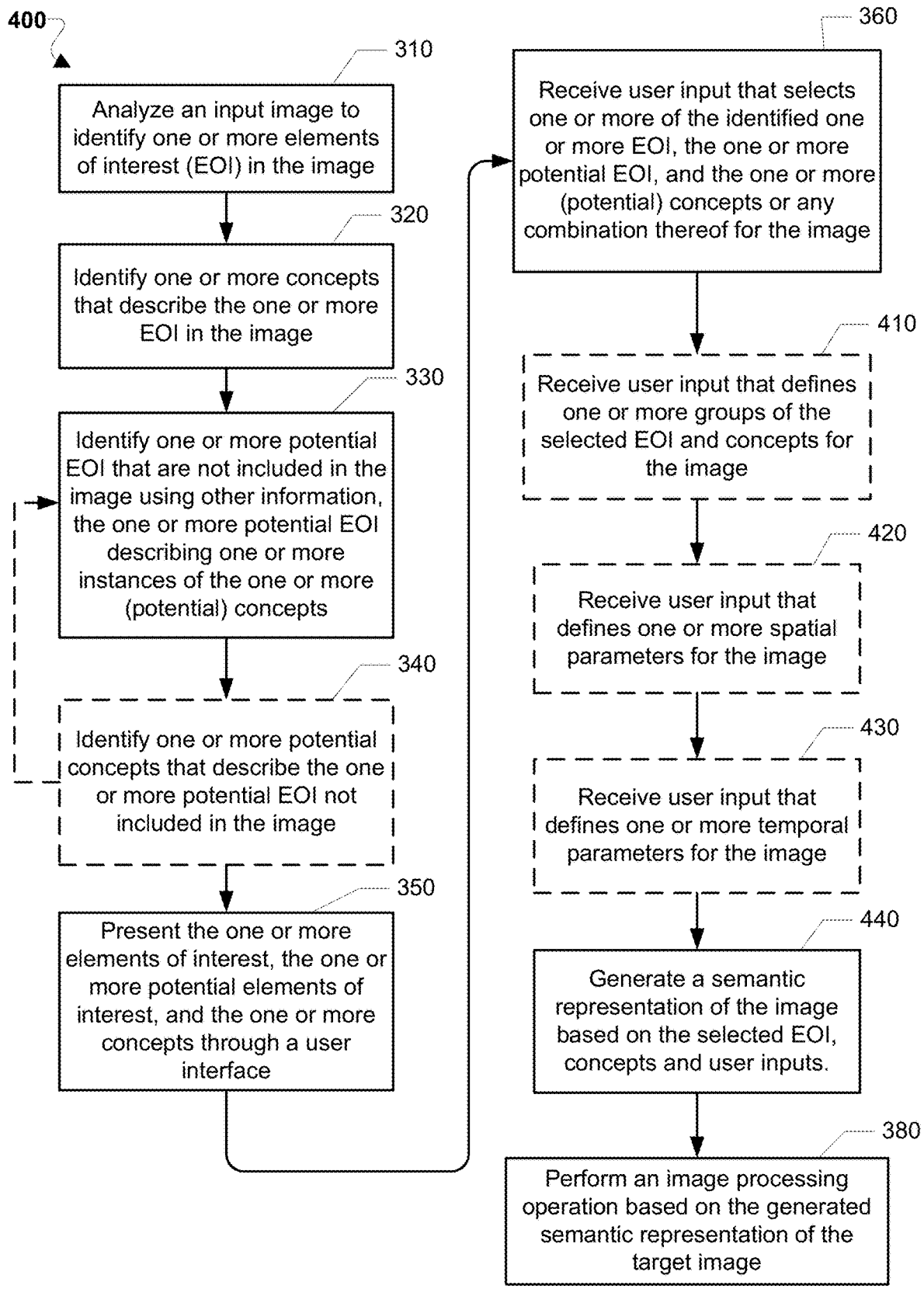
FIG. 4 is a process flow diagram illustrating another method for generating a semantic representation of a target image according to some embodiments.

FIG. 4 is a process flow diagram illustrating another method 400 for generating a semantic representation of a target image according to some embodiments. With reference to FIGS. 1A to 1F and FIG. 3, the operations of the method 400 may be performed by one or more processors of a remote server or one or more processors of a computing device executing a local service, or any combination thereof. For example, in some embodiments, the method 400 may be performed partially using the local service and partially using the remote server. For example, the processor of the computing device executing the local service may be configured to quickly compute an initial set of elements of interest and concepts using a local database, and the remote server may be configured to return additional elements of interest and concepts to augment the initial set computed locally.

The method 400 includes operations in blocks 310 through 360 and block 380 that are described for like numbered blocks with reference to FIG. 3.

In block 410, the processor may receive user inputs (e.g., through a user interface (e.g., 100)) that includes one or more grouping parameters. The one or more grouping parameters may define one or more groups of the selected elements of interest and concepts for the target image. For example, the processor may receive the user inputs through a group settings tool (e.g., 130 of FIG. 1D) of the user interface (e.g., 100). In some embodiments, the group settings tool (e.g., 130) may enable a user to define a group by specifying one or more grouping parameters (e.g., Boolean parameters) between individual EOIs or concepts or between previously defined groups of EOIs or concepts. In some embodiments, the group settings tool 130 may display an automatically generated list of selectable groups of elements of interest and/or concepts identified in the selected elements of interest and concepts. In some embodiments, one or more interactive selection elements (e.g., checkboxes, radio boxes, selectable menu items, etc.) may be presented in the group settings tool (e.g., 130) for selecting a desired grouping parameter or automatically generated group.

In block 420, the processor may receive user inputs (e.g., through the user interface (e.g., 100)) that includes one or more spatial parameters for the target image. In some embodiments, the one or more spatial parameters may define one or more spatial relationships amongst the selected elements of interest and concepts for the target image. For example, in some embodiments, the processor may receive the user inputs through a spatial settings tool (e.g., 140 of FIG. 1E). In some embodiments, a spatial parameter may define a spatial relationship between two or more elements of interest or concepts identified in the target image (e.g., "man" IN FRONT OF "bridge"). Examples of other spatial relationships may include, without limitation, "in back of," "above," "below," "overlaying," "to the left of," "to the right of," etc. In some embodiments, the spatial settings tool 140 may be configured to enable a user to define a viewpoint of a selected elements of interest for the target image. For example, the spatial settings tool 140 may enable a user to specify a viewpoint of the selected elements of interest at a desired angular perspective (e.g., 360-degree camera-like interface).

In block 430, the processor may receive user inputs (e.g., through the user interface) that includes one or more temporal parameters for the target image. The one or more temporal parameters may define a specific time or time period for the target image. In some embodiments, the set time or time period may correspond to when the target image was created or when the target image was uploaded or stored in a database, which may be obtained from metadata within or associated with the target image. In some embodiments, the processor may receive the user input through a temporal settings tool (e.g., 150 of FIG. 1F). For example, in some embodiments, the temporal settings tool 150 may be a graphical slider bar that specifies a timeline covering a period of years. In some embodiments, the specified timeline may cover longer or shorter time spans. By dragging a slider element of the graphical slider bar forward or backward, a user may set a specific time or time period for the target image (e.g., "1980").

In block 440, the processor may generate a semantic representation of the target image based on the selected elements of interest and concepts and the user input received in one or more of blocks 410, 420, and 430. For example, in some embodiments, the semantic representation of the target image may be implemented a text string, array, linked list, or other data structure that includes a list of the selected elements of interest and concepts. In some embodiments, the data structure of the semantic representation for the target image may include the one or more grouping parameters received in block 410, the one or more spatial parameters received in block 420, and the one or more temporal parameters received in block 430.

Figure 5:
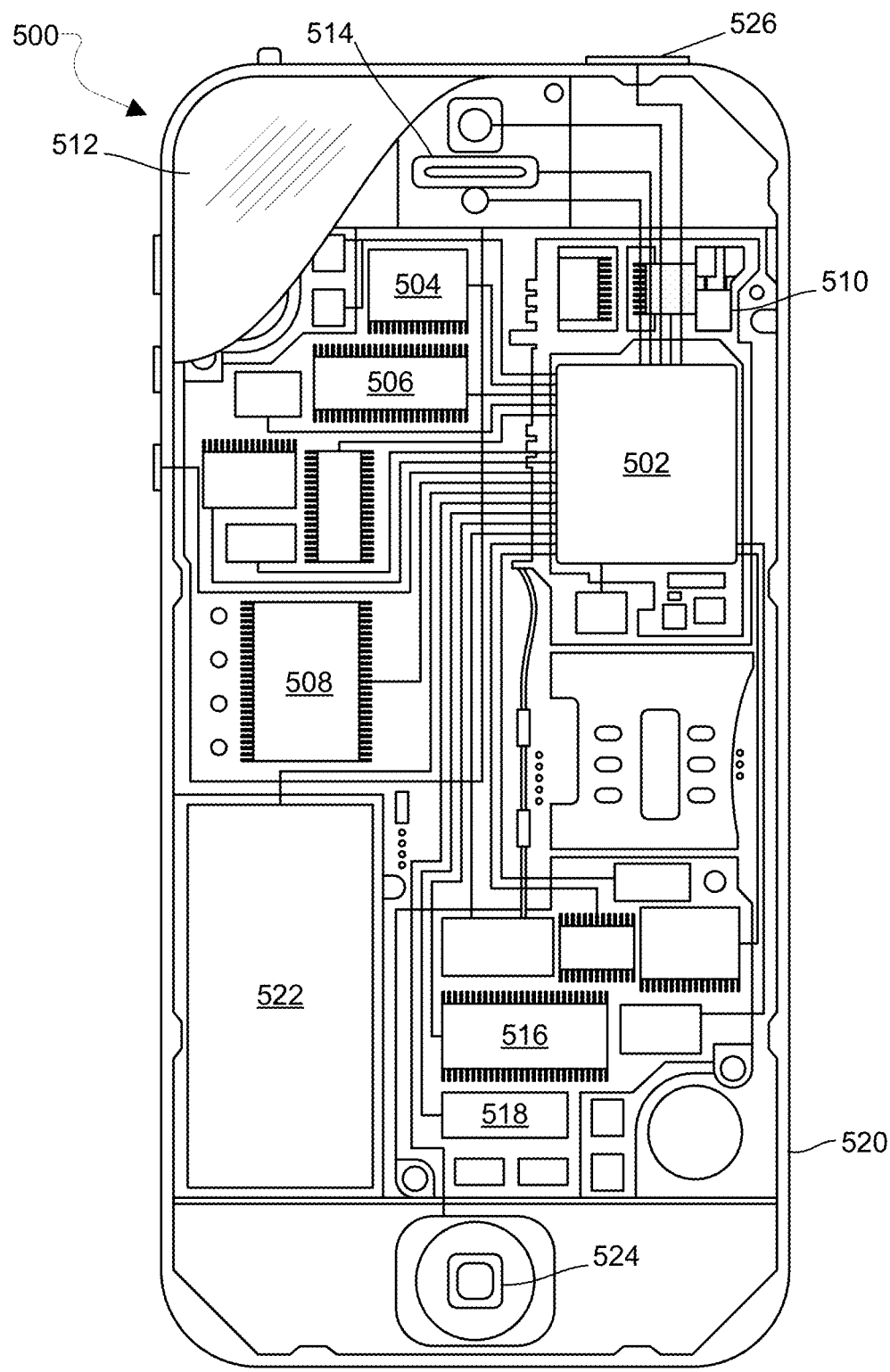
FIG. 5 is a schematic diagram illustrating components of a smartphone type mobile communication device suitable for use with various embodiments.

The various embodiments may be implemented on any of a variety of commercially available computing devices. For example, FIG. 5 is a schematic diagram illustrating components of a smartphone type mobile communication device 700 that may be configured to implement methods according to some embodiments, including the embodiments of the methods 300 and 400 described with reference to FIGS. 3 and 4. A mobile communication device 500 may include a processor 502 coupled to a touchscreen controller 504 and an internal memory 506. The processor 502 may be one or more multi-core integrated circuits designated for general or specific processing tasks. The internal memory 506 may be volatile or non-volatile memory. The touchscreen controller 504 and the processor 502 may also be coupled to a display, such as a touchscreen panel 512, which may be a resistive-sensing touchscreen, capacitive-sensing touchscreen, infrared sensing touchscreen, etc. The display of the communication device 500 need not have touch screen capability and user inputs may be received via a mouse, a keyboard, a touch pad, etc. Additionally, the mobile communication device 500 may include a cellular network transceiver 508 coupled to the processor 502 and to an antenna 510 for sending and receiving electromagnetic radiation that may be connected to a wireless data link. The transceiver 508 and the antenna 510 may be used with the above-mentioned circuitry to implement various embodiment methods.

The mobile communication device 500 may have a cellular network transceiver 508 coupled to the processor 502 and to an antenna 510 and configured for sending and receiving cellular communications. The mobile communication device 500 may include one or more subscriber identity module (SIM) cards 516, 518 coupled to the transceiver 508 and/or the processor 502 and may be configured as described above.

The mobile communication device 500 may also include speakers 514 for providing audio outputs. The mobile communication device 500 may also include a housing 520, constructed of a plastic, metal, or a combination of materials, for containing all or some of the components discussed herein. The mobile communication device 500 may include a power source 522 coupled to the processor 502, such as a disposable or rechargeable battery. The rechargeable battery may also be coupled to the peripheral device connection port to receive a charging current from a source external to the communication device 500. The communication device 500 may also include a physical button 524 for receiving user inputs. The mobile communication device 500 may also include a power button 526 for turning the mobile communication device 500 on and off.

Figure 6:
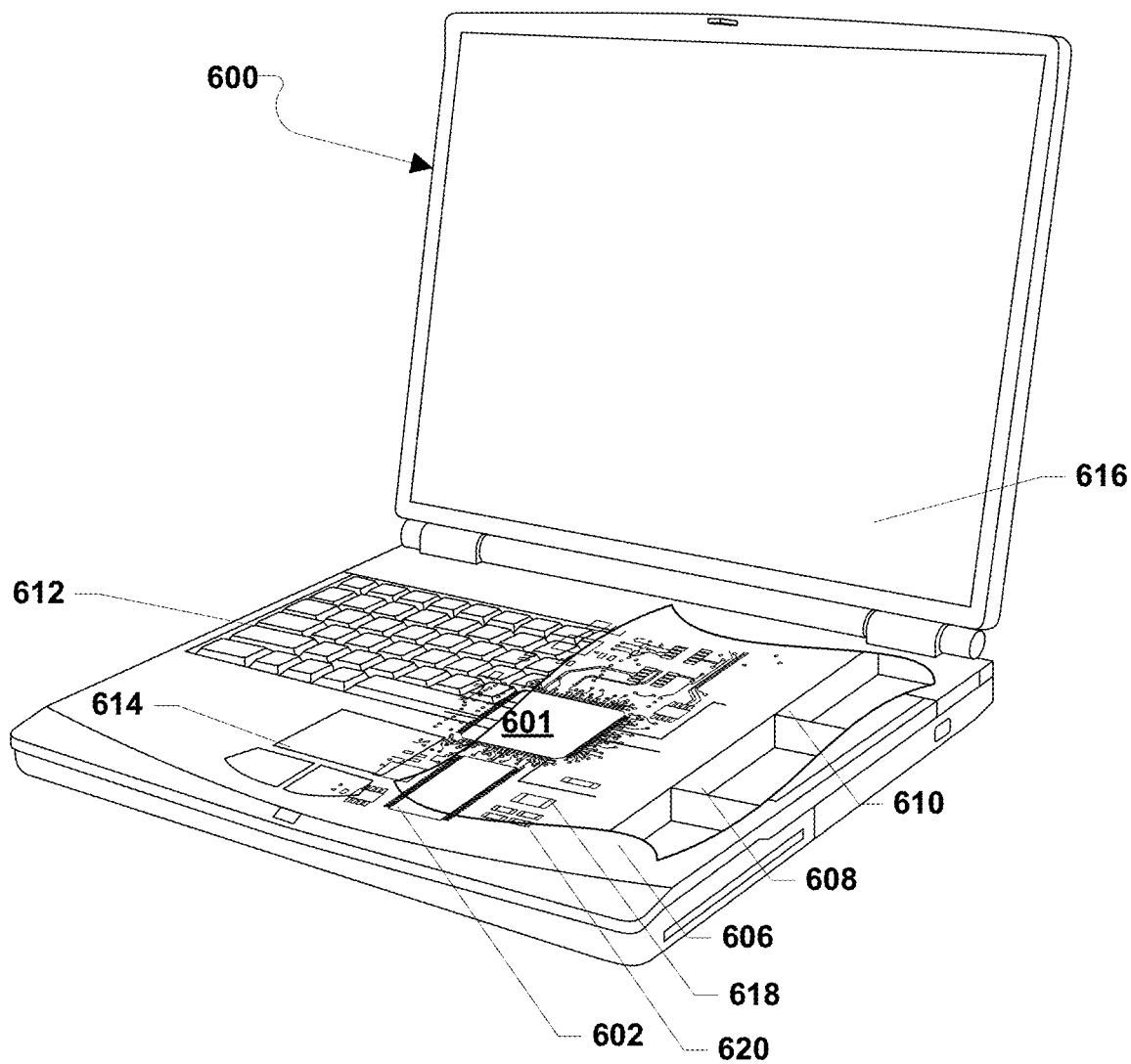
FIG. 6 is a schematic diagram illustrating components of a laptop computing device suitable for use with various embodiments.

Other forms of computing devices, including personal computers and laptop computers, may be used to implementing the various embodiments. For example, FIG. 6 is a schematic diagram illustrating components of a laptop computing device 600 that may be configured to implement methods according to some embodiments, including the embodiments of the methods 300 and 400 described with reference to FIGS. 3 and 4. In some embodiments, the laptop computing device 600 may include a touch pad 614 that serves as the computer's pointing device, and thus may receive drag, scroll, and flick gestures similar to those implemented on mobile computing devices equipped with a touch screen display and described above. Such a laptop computing device 600 generally includes a processor 601 coupled to volatile internal memory 602 and a large capacity nonvolatile memory, such as a disk drive 606. The laptop computing device 600 may also include a compact disc (CD) and/or DVD drive 608 coupled to the processor 601.

The laptop computing device 600 may also include a number of connector ports 610 coupled to the processor 601 for establishing data connections or receiving external memory devices, such as a network connection circuit for coupling the processor 601 to a network. The laptop computing device 600 may have one or more radio signal transceivers 618 (e.g., Peanut®, Bluetooth®, ZigBee®, Wi-Fi®, RF radio) and antennas 620 for sending and receiving wireless signals as described herein. The transceivers 618 and antennas 620 may be used with the above-mentioned circuitry to implement the various wireless transmission protocol stacks/interfaces. In a laptop or notebook configuration, the computer housing includes the touch pad 614, the keyboard 612, and the display 616 all coupled to the processor 601. Other configurations of the computing device may include a computer mouse or trackball coupled to the processor (e.g., via a universal serial bus (USB) input) as are well known, which may also be used in conjunction with the various embodiments.

Figure 7:
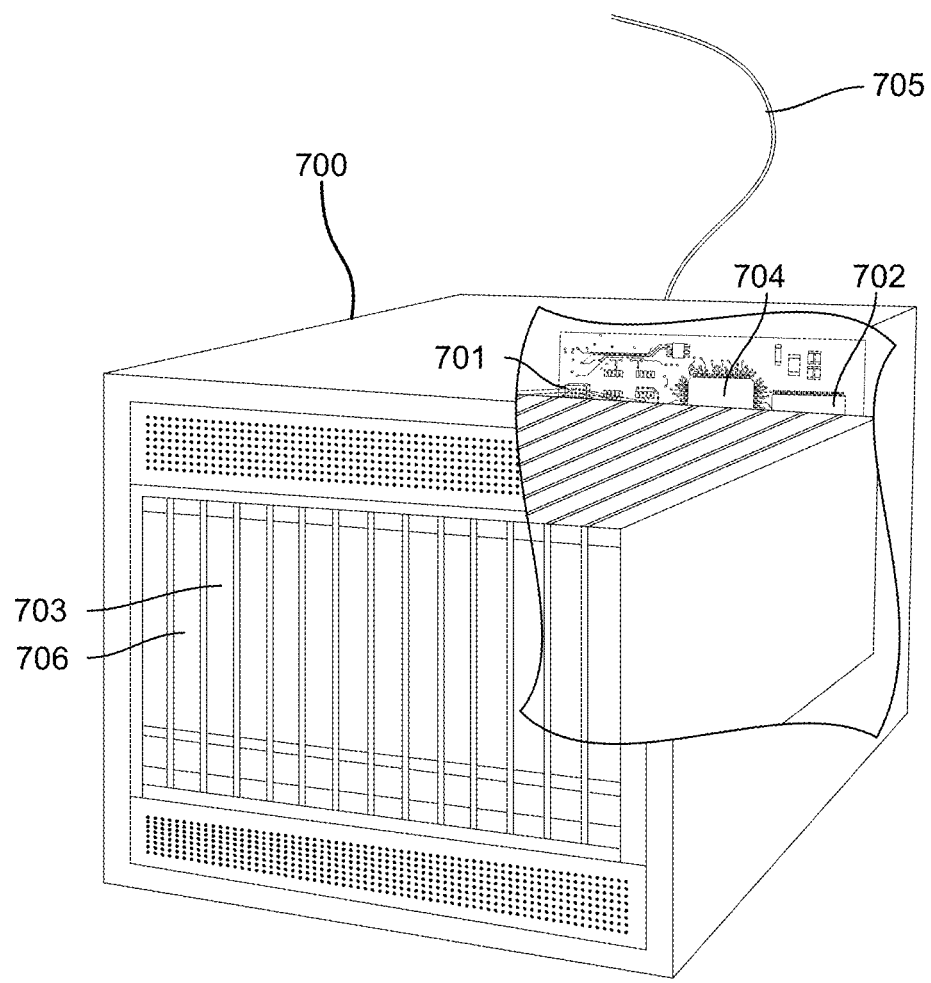
FIG. 7 is a schematic diagram illustrating components of a server suitable for use with various embodiments.

FIG. 7 is a schematic diagram illustrating components of a server 700 that may be configured to implement methods according to some embodiments, including the embodiments of the methods 300 and 400 described with reference to FIGS. 3 and 4. Such a server 700 may be located remotely, such as in "the cloud." Such a server 700 typically includes a processor 701 coupled to volatile memory 702 and a large capacity nonvolatile memory, such as a disk drive 703. The server 700 may also include a floppy disc drive, compact disc (CD) or digital versatile disc (DVD) disc drive 706 coupled to the processor 701. The server 700 may also include network access ports 704 coupled to the processor 701 for establishing data connections with a network 705, such as a local area network coupled to other broadcast system computers and servers.

The processor 701 may be any programmable microprocessor, microcomputer or multiple processor chip or chips that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory 702, 703 before they are accessed and loaded into the processor 701. The processor 701 may include internal memory sufficient to store the application software instructions.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of generating a semantic representation of an image for an image processing operation, comprising:
    analyzing the image to identify one or more elements of interest in the image;
    identifying one or more concepts associated with the one or more elements of interest in the image;
    recursively identifying one or more potential elements of interest that are not included in the image, one or more potential concepts that describe the identified potential elements, and potential elements of interest that describe the one or more potential concepts until a maximum recursion depth is reached, wherein in a first iteration the potential elements of interest correspond to one or more instances of the one or more concepts;
    presenting to a user the one or more elements of interest, the one or more potential elements of interest, and the one or more concepts;
    receiving a user input that selects one or more of the one or more elements of interest, the one or more potential elements of interest, and the one or more concepts identified in the identified elements of interest and concepts or any combination thereof for a target image; and
    generating the semantic representation of the target image based on the selected elements of interest and concepts.

2. The method of claim 1, further comprising:
    performing the image processing operation based on the generated semantic representation of the target image, wherein the image processing operation comprises an image search operation, an image editing operation, and an image mining operation, or any combination thereof.

3. The method of claim 1, further comprising:
    receiving a user input that includes one or more grouping parameters, wherein the one or more grouping parameters define one or more groups of the selected elements of interest and concepts for the target image,
    wherein generating the semantic representation of the target image based on the selected elements of interest and concepts comprises generating the semantic representation of the target image based on the selected elements of interest and concepts and the user input.

4. The method of claim 1, further comprising:
    receiving a user input that includes one or more spatial parameters for the target image, wherein the one or more spatial parameters define one or more spatial relationships amongst the selected elements of interest and concepts for the target image; and
    generating the semantic representation of the target image based on the selected elements of interest and concepts and the user input.

5. The method of claim 1, further comprising:
    receiving a user input that includes one or more temporal parameters for the target image, wherein the one or more temporal parameters define a specific time or time period for the target image,
    wherein generating the semantic representation of the target image based on the selected elements of interest and concepts comprises generating the semantic representation of the target image based on the selected elements of interest and concepts and the user input.

6. The method of claim 1, further comprising:
    receiving a user input of a first semantic representation of the target image;
    querying a database using the first semantic representation of the target image;
    retrieving a plurality of images and associated metadata from the database in response to querying the database with the first semantic representation; and
    sorting the plurality of images and associated metadata based on a ranking,
    wherein analyzing the image to identify one or more elements of interest in the image comprises analyzing one or more top ranked images and associated metadata amongst the plurality of images and associated metadata to identify one or more elements of interest in the one or more top ranked images,
    wherein identifying the one or more concepts associated with the one or more elements of interest in the image comprising identifying one or more concepts associated with the one or more elements of interest identified in one or more top ranked images, and wherein identifying the one or more potential elements of interest that are not included in the image using the other information comprises identifying one or more potential elements of interest that are not included in the one or more top ranked images using the associated metadata of the one or more top ranked images.

7. A computing device, comprising:
a memory; and
a processor coupled to the memory and configured with processor executable instructions to perform operations comprising:
analyzing an image to identify one or more elements of interest in the image;
identifying one or more concepts associated with the one or more elements of interest in the image;
recursively identifying one or more potential elements of interest that are not included in the image, one or more potential concepts that describe the identified potential elements, and potential elements of interest that describe the one or more potential concepts until a maximum recursion depth is reached, wherein in a first iteration wherein the potential elements of interest correspond to one or more instances of the one or more concepts;
presenting to a user the one or more elements of interest, the one or more potential elements of interest, and the one or more concepts;
receiving a user input that selects one or more of the one or more elements of interest, the one or more potential elements of interest, and the one or more concepts identified in the identified elements of interest and concepts or any combination thereof for a target image;
and
generating the semantic representation of the target image based on the selected elements of interest and concepts.

8. The computing device of claim 7, wherein the processor is configured with processor executable instructions to perform operations further comprising:
performing an image processing operation based on the generated semantic representation of the target image, wherein the image processing operation comprises an image search operation, an image editing operation, and an image mining operation, or any combination thereof.

9. The computing device of claim 7, wherein the processor is configured with processor executable instructions to perform operations further comprising:
receiving a user input that includes one or more grouping parameters, wherein the one or more grouping parameters define one or more groups of the selected elements of interest and concepts for the target image,
wherein the processor is configured with processor executable instructions to perform operations such that generating the semantic representation of the target image based on the selected elements of interest and concepts comprises generating the semantic representation of the target image based on the selected elements of interest and concepts and the user input.

10. The computing device of claim 7, wherein the processor is configured with processor executable instructions to perform operations further comprising:
receiving a user input that includes one or more spatial parameters for the target image, wherein the one or more spatial parameters define one or more spatial relationships amongst the selected elements of interest and concepts for the target image; and
generating the semantic representation of the target image based on the selected elements of interest and concepts and the user input.

11. The computing device of claim 7, wherein the processor is configured with processor executable instructions to perform operations further comprising:
receiving a user input that includes one or more temporal parameters for the target image, wherein the one or more temporal parameters define a specific time or time period for the target image,
wherein the processor is configured with processor executable instructions to perform operations such that generating the semantic representation of the target image based on the selected elements of interest and concepts comprises generating the semantic representation of the target image based on the selected elements of interest and concepts and the user input.

12. The computing device of claim 7, wherein the processor is configured with processor executable instructions to perform operations further comprising:
receiving a user input of a first semantic representation of the target image;
querying a database using the first semantic representation of the target image;
retrieving a plurality of images and associated metadata from the database in response to querying the database with the first semantic representation; and
sorting the plurality of images and associated metadata based on a ranking,
wherein the processor is configured with processor executable instructions to perform operations such that:
analyzing the image to identify one or more elements of interest in the image comprises analyzing one or more top ranked images and associated metadata amongst the plurality of images and associated metadata to identify one or more elements of interest in the one or more top ranked images;
identifying the one or more concepts associated with the one or more elements of interest in the image comprising identifying one or more concepts associated with the one or more elements of interest identified in one or more top ranked images; and
identifying the one or more potential elements of interest that are not included in the image using the other information comprises identifying one or more potential elements of interest that are not included in the one or more top ranked images using the associated metadata of the one or more top ranked images.

13. A computing device, comprising:
means for analyzing an image to identify one or more elements of interest in the image;
means for identifying one or more concepts associated with the one or more elements of interest in the image;
means for recursively identifying one or more potential elements of interest that are not included in the image, one or more potential concepts that describe the identified potential elements, and potential elements of interest that describe the one or more potential concepts until a maximum recursion depth is reached, wherein in a first iteration the potential elements of interest correspond to one or more instances of the one or more concepts;

means for presenting to a user the one or more elements of interest, the one or more potential elements of interest, and the one or more concepts;

means for receiving a user input that selects one or more of the one or more elements of interest, the one or more potential elements of interest, and the one or more concepts identified in the identified elements of interest and concepts or any combination thereof for a target image; and means for generating the semantic representation of the target image based on the selected elements of interest and concepts.

14. The computing device of claim 13, further comprising:

means for performing an image processing operation based on the generated semantic representation of the target image, wherein the image processing operation comprises an image search operation, an image editing operation, and an image mining operation, or any combination thereof.

15. The computing device of claim 13, further comprising:

means for receiving a user input that includes one or more grouping parameters, wherein the one or more grouping parameters define one or more groups of the selected elements of interest and concepts for the target image, wherein means for generating the semantic representation of the target image based on the selected elements of interest and concepts comprises means for generating the semantic representation of the target image based on the selected elements of interest and concepts and the user input.

16. The computing device of claim 13, further comprising:

means for receiving a user input that includes one or more spatial parameters for the target image, wherein the one or more spatial parameters define one or more spatial relationships amongst the selected elements of interest and concepts for the target image; and means for generating the semantic representation of the target image based on the selected elements of interest and concepts and the user input.

17. The computing device of claim 13, further comprising:

means for receiving a user input that includes one or more temporal parameters for the target image, wherein the one or more temporal parameters define a specific time or time period for the target image, wherein means for generating the semantic representation of the target image based on the selected elements of interest and concepts comprises means for generating the semantic representation of the target image based on the selected elements of interest and concepts and the user input.

18. The computing device of claim 13, further comprising:

means for receiving a user input of a first semantic representation of the target image;

means for querying a database using the first semantic representation of the target image;

means for retrieving a plurality of images and associated metadata from the database in response to querying the database with the first semantic representation; and means for sorting the plurality of images and associated metadata based on a ranking, wherein:

means for analyzing the image to identify one or more elements of interest in the image comprises means for analyzing one or more top ranked images and associated metadata amongst the plurality of images and associated metadata to identify one or more elements of interest in the one or more top ranked images, means for identifying the one or more concepts associated with the one or more elements of interest in the image comprising means for identifying one or more concepts associated with the one or more elements of interest identified in one or more top ranked images, and means for identifying the one or more potential elements of interest that are not included in the image using the metadata associated with other images in a database of images comprises means for identifying one or more potential elements of interest that are not included in the one or more top ranked images using the associated metadata of the one or more top ranked images.

19. A non-transitory processor-readable medium having stored thereon processor-executable instructions configured to cause a processor of a computing device to perform operations comprising:

analyzing an image to identify one or more elements of interest in the image;

identifying one or more concepts associated with the one or more elements of interest in the image;

recursively identifying one or more potential elements of interest that are not included in the image, one or more potential concepts that describe the identified potential elements, and potential elements of interest that describe the one or more potential concepts until a maximum recursion depth is reached, wherein in a first iteration the potential elements of interest correspond to one or more instances of the one or more concepts;

presenting to a user the one or more elements of interest, the one or more potential elements of interest, and the one or more concepts;

receiving a user input that selects one or more of the one or more elements of interest, the one or more potential elements of interest, and the one or more concepts identified in the identified elements of interest and concepts or any combination thereof for a target image; and generating the semantic representation of the target image based on the selected elements of interest and concepts.

20. The non-transitory processor-readable medium of claim 19, wherein the stored processor-executable instructions are configured to cause the processor of the computing device to perform operations further comprising:

performing an image processing operation based on the generated semantic representation of the target image, wherein the image processing operation comprises an image search operation, an image editing operation, and an image mining operation, or any combination thereof.

21. The non-transitory processor-readable medium of claim 19, wherein the stored processor-executable instructions are configured to cause the processor of the computing device to perform operations further comprising receiving a user input that includes one or more grouping parameters, wherein the one or more grouping parameters define one or more groups of the selected elements of interest and concepts for the target image, wherein the stored processor-executable instructions are configured to cause the processor of the computing device to perform operations such that generating the semantic representation of the target image based on the selected elements of interest and concepts comprises generating the semantic representation of the target image based on the selected elements of interest and concepts and the user input.

22. The non-transitory processor-readable medium of claim 19, wherein the stored processor-executable instructions are configured to cause the processor of the computing device to perform operations further comprising:
receiving a user input that includes one or more spatial parameters for the target image, wherein the one or more spatial parameters define one or more spatial relationships amongst the selected elements of interest and concepts for the target image; and
generating the semantic representation of the target image based on the selected elements of interest and concepts and the user input.

23. The non-transitory processor-readable medium of claim 19, wherein the stored processor-executable instructions are configured to cause the processor of the computing device to perform operations further comprising receiving a user input that includes one or more temporal parameters for the target image, wherein the one or more temporal parameters define a specific time or time period for the target image,
wherein the stored processor-executable instructions are configured to cause the processor of the computing device to perform operations such that generating the semantic representation of the target image based on the selected elements of interest and concepts comprises generating the semantic representation of the target image based on the selected elements of interest and concepts and the user input.

24. The non-transitory processor-readable medium of claim 19, wherein the stored processor-executable instructions are configured to cause the processor of the computing device to perform operations further comprising:
receiving a user input of a first semantic representation of the target image;
querying a database using the first semantic representation of the target image;
retrieving a plurality of images and associated metadata from the database in response to querying the database with the first semantic representation; and
sorting the plurality of images and associated metadata based on a ranking,
wherein the stored processor-executable instructions are configured to cause the processor of the computing device to perform operations such that:
analyzing the image to identify one or more elements of interest in the image comprises analyzing one or more top ranked images and associated metadata amongst the plurality of images and associated metadata to identify one or more elements of interest in the one or more top ranked images,
identifying the one or more concepts associated with the one or more elements of interest in the image comprising identifying one or more concepts associated with the one or more elements of interest identified in one or more top ranked images, and
identifying the one or more potential elements of interest that are not included in the image using the other information comprises identifying one or more potential elements of interest that are not included in the one or more top ranked images using the associated metadata of the one or more top ranked images.

* * * * *